US007610460B2

(12) United States Patent
Watanabe et al.

(10) Patent No.: US 7,610,460 B2
(45) Date of Patent: Oct. 27, 2009

(54) BUFFER UPDATES AND DATA EVACUATION IN A STORAGE SYSTEM USING DIFFERENTIAL SNAPSHOTS

(75) Inventors: Satoru Watanabe, Kokubunji (JP); Yoshio Suzuki, Kokubunji (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 89 days.

(21) Appl. No.: 11/454,088

(22) Filed: Jun. 16, 2006

(65) Prior Publication Data

US 2007/0271426 A1 Nov. 22, 2007

(30) Foreign Application Priority Data

May 22, 2006 (JP) .............................. 2006-141379

(51) Int. Cl.
G06F 13/14 (2006.01)
G06F 12/12 (2006.01)
(52) U.S. Cl. ...................................... 711/162; 711/113
(58) Field of Classification Search ................ 711/162, 711/113
See application file for complete search history.

(56) References Cited

U.S. PATENT DOCUMENTS

| 5,826,076 | A * | 10/1998 | Bradley et al. ................. 707/4 |
| 7,032,089 | B1 * | 4/2006 | Ranade et al. ................ 711/161 |
| 2002/0107810 | A1 * | 8/2002 | Nishio et al. .................. 705/59 |
| 2002/0129203 | A1 * | 9/2002 | Gagne et al. ................. 711/114 |
| 2003/0225993 | A1 * | 12/2003 | Yagisawa et al. ............ 711/202 |
| 2004/0030730 | A1 * | 2/2004 | Arai et al. .................... 707/204 |
| 2004/0181642 | A1 | 9/2004 | Watanabe et al. |
| 2004/0230737 | A1 * | 11/2004 | Burton et al. .................. 711/3 |
| 2005/0010726 | A1 * | 1/2005 | Rai et al. ..................... 711/137 |
| 2005/0120163 | A1 * | 6/2005 | Chou et al. .................. 711/103 |
| 2005/0289314 | A1 * | 12/2005 | Adusumilli et al. .......... 711/168 |
| 2007/0255921 | A1 * | 11/2007 | Gole et al. ................... 711/170 |

FOREIGN PATENT DOCUMENTS

JP 2004-272854 9/2004

OTHER PUBLICATIONS

"Run-Time Load Balancing System on San-Connected PC Cluster for Dynamic Injection of CPU and Disk Resource" by K. Goda, et al. pp. 182-193 of Proceedings of 13th International Conference on Database and Expert Systems Applications (DEXA 2002), Sep. 2002.

* cited by examiner

Primary Examiner—Matt Kim
Assistant Examiner—Hal Schnee
(74) Attorney, Agent, or Firm—Brundidge & Stanger, P.C.

(57) ABSTRACT

A method of managing data by a storage system having first and second volumes according to a command from a server computer, including receiving a data access command from the server computer; specifying a data area that is designated in the data access command and reading data in the data area from the first volume; judging whether the data access command contains a data evacuating instruction; judging whether the data in the data area has been evacuated to the second volume when the data read command contains the data evacuating instruction; evacuating the data in the data area to the second volume when the data in the data area has not been evacuated to the second volume; and sending the data in the data area to the server computer. The invention reduces loads on the storage system when a differential snapshot is used.

1 Claim, 12 Drawing Sheets

121 DATA AREA MANAGEMENT TABLE

| 1210 TABLE NAME | 1211 IDENTIFICATION COLUMN NAME | 1212 IDENTIFICATION COLUMN | 1213 VOLUME NAME | 1214 ADDRESS |
|---|---|---|---|---|
| Warehouse | W_id | 1 | VOL1 | 0 |
| Warehouse | W_id | 2 | VOL1 | 1 |
| ⋮ | ⋮ | ⋮ | ⋮ | ⋮ |

*FIG. 3*

140 DB BUFFER

| 1401 VOLUME NAME | 1402 ADDRESS | 1403 DATA |
|---|---|---|
| VOL1 | 1 | Nagoya |
| VOL2 | 2 | Hokkaido |
| | | |

*FIG. 4*

211 VOLUME MANAGEMENT TABLE

| 2111 VOLUME NAME | 2112 TYPE | 2113 DRIVE NAME | 2114 DIFFERENTIAL VOLUME NAME |
|---|---|---|---|
| VOL1 | Primary | FIRST DRIVE | VOL2 |
| VOL2 | Differential | SECOND DRIVE | VOL1 |
| ⋮ | ⋮ | ⋮ | ⋮ |

*FIG. 5*

101 DATABASE

| 1011 ADDRESS | 1012 DATA |
|---|---|
| 0 | "AAA" |
| 1 | "BBB" |
| 2 | |
| ⋮ | ⋮ |

*FIG. 6*

221 DIFFERENTIAL BACKUP DATA MANAGEMENT TABLE

| 2211 ADDRESS | 2212 EVACUATION DESTINATION ADDRESS |
|---|---|
| 100 | 0 |
| 200 | 1 |
| 300 | 2 |
| ⋮ | ⋮ |

FIG. 7

222 EVACUATION MANAGEMENT TABLE

| 2221 ADDRESS | 2222 EVACUATION FLAG |
|---|---|
| 0 | 0 |
| 1 | 0 |
| 2 | 0 |
| ⋮ | ⋮ |

FIG. 8

BUFFER UPDATES AND DATA EVACUATION IN A STORAGE SYSTEM USING DIFFERENTIAL SNAPSHOTS

CLAIM OF PRIORITY

The present application claims priority from Japanese application P2006-141379 filed on May 22, 2006, the content of which is hereby incorporated by reference into this application.

BACKGROUND OF THE INVENTION

This invention relates to a method of managing data stored in a storage system, and more particularly, to a data management method using a differential snapshot technique.

In a computer system, data stored in a storage system may be duplicated for backup or checking of the data. Examples of a method of duplicating data include a method of copying all data to another data area. However, the copy method requires data storage area having a large size in order to store both source data and destination data. Therefore, a so-called differential snapshot technique is used to duplicate data virtually by managing only data update differentials.

When using the differential snapshot technique, two data storage areas are set in the storage system. One data storage area is called a primary volume, and the other data storage area is called a differential volume. The primary volume stores the source data. In a case of updating data stored in the primary volume, data that has not been updated is evacuated to the differential volume. To refer to the destination data, it is first checked whether or not the data is evacuated to the differential volume. When it is determined that the data has been evacuated, the data stored in the differential volume is referred to. When it is determined that the data has not been evacuated, the data stored in the primary volume is referred to. Further, when updating the data stored in the differential volume, an updated piece of the data is stored in the differential volume.

The differential volume stores only the updated piece of data, thereby having a small size. Accordingly, by using the differential snapshot technique, data can be duplicated virtually without using a large-size data storage area.

An example of such the differential snapshot technique is disclosed in JP 2004-272854 A. A known technique related to a data evacuation is found in an article written by Kazuo Goda, Takayuki Tamura, Masato Oguchi, and Masaru Kitsuregawa, and titled "Run-time Load Balancing System on SAN-connected PC Cluster for Dynamic Injection of CPU and Disk Resource. . . . A Case Study of Data Mining Application . . ." on pages 182-192 of Proceedings of 13th International Conference on Database and Expert Systems Applications (DEXA 2002), which was issued in September 2002.

SUMMARY OF THE INVENTION

In the computer system, application programs running on a server computer often instructs the storage system to access data. Examples of the application programs include a database management system (DBMS). To update data, the application program such as the DBMS may temporarily read the data into a memory area of the server computer, modify the data in the memory area, and write the modified data into the storage system.

Thus, to update data within the primary volume, access is made to the primary volume three times as follows. That is, the application program first reads data to be updated from the primary volume into the memory area. Then, the application program writes the data into the storage system. In the writing process, the data within the primary volume is read out in order to evacuate the data that has not been updated, while the updated data is written into the primary volume. This raises a problem in that the number of accesses to the primary volume increases, and loads on the storage system become heavier.

This invention has been made in view of the above, and it is therefore an object of this invention to reduce loads on a storage system while taking advantage of a differential snapshot.

According to an embodiment of this invention, there is provided a method of managing data by a storage system having a first volume and a second volume according to a command given from a server computer, including the steps of:

receiving, by the storage system, a data access command from the server computer;

specifying, by the storage system, a data area that is designated in the data access command and reading data in the data area from the first volume;

judging, by the storage system, whether or not the data access command contains a data evacuating instruction;

judging, by the storage system, whether or not the data in the data area has been evacuated to the second volume in a case where the data read command contains the data evacuating instruction;

evacuating, by the storage system, the data in the data area to the second volume in a case where the data in the data area has not been evacuated to the second volume; and sending, by the storage system, the data in the data area to the server computer.

According to this invention, the data can be evacuated to the second volume when the data is read into the memory area, so the number of accesses to the first volume can be reduced to two. Because the data has already been evacuated, there is no need to read the data within the first volume when the data is updated. Consequently, it is possible to reduce the loads on the storage system.

BRIEF DESCRIPTION OF THE DRAWINGS

FIG. 3 is an explanatory diagram showing an example of a data area management table.

FIG. 4 is an explanatory diagram showing an example of a DB buffer.

FIG. 5 is an explanatory diagram showing an example of a volume management table.

FIG. 6 is an explanatory diagram showing contents of a database.

FIG. 7 is an explanatory diagram showing an example of a differential backup data management table.

FIG. 8 is an explanatory diagram showing an example of an evacuation management table.

DETAILED DESCRIPTION OF THE PREFERRED EMBODIMENTS

Embodiments of this invention will be described below with reference to the accompanying drawings.

Figure 1:
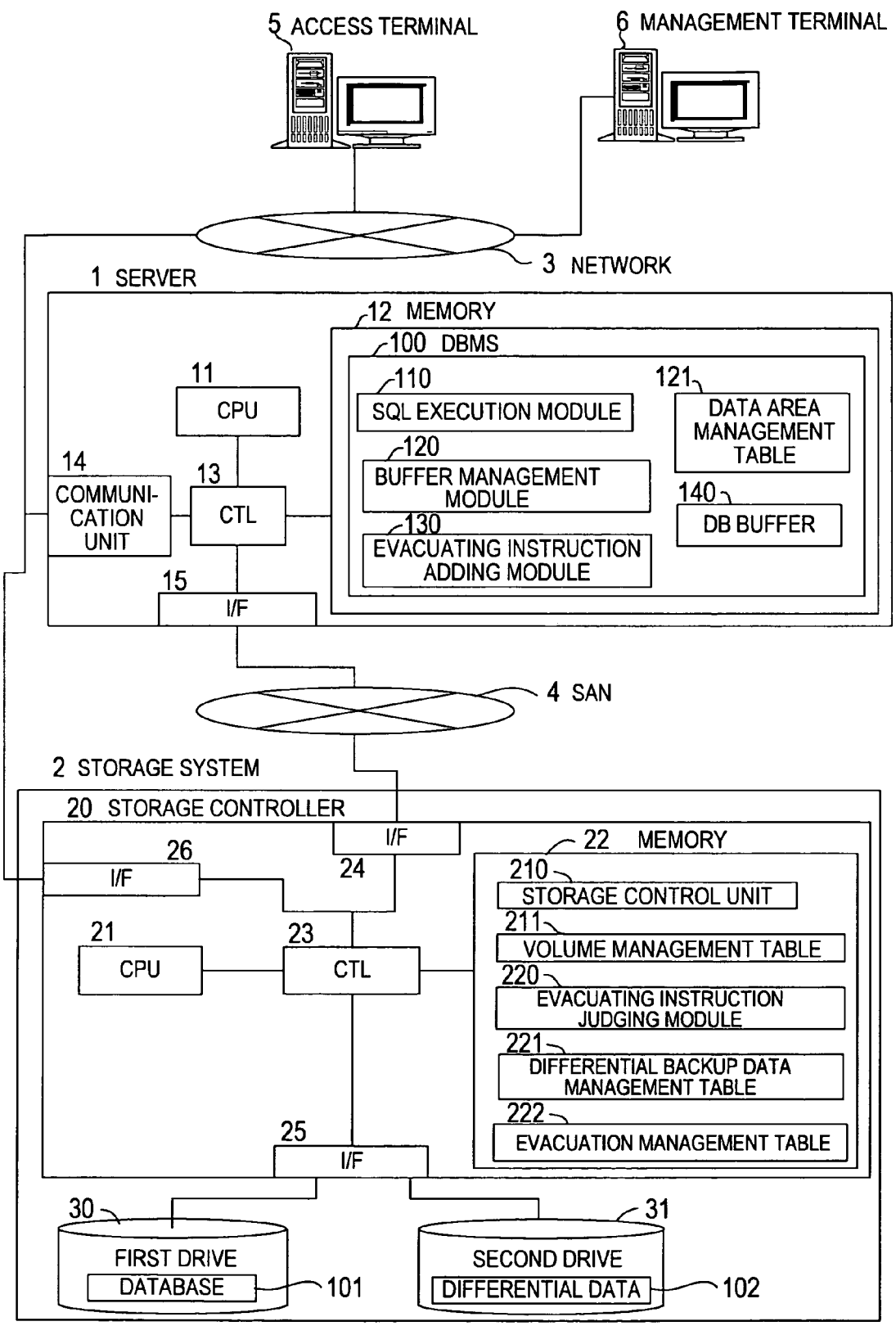
FIG. 1 is a block diagram of a computer system according to a first embodiment of this invention.

FIG. 1 is a block diagram showing a configuration of a computer system according to a first embodiment to which this invention is applied. FIG. 1 shows the computer system including: a server 1 on which a database management system (DBMS) runs; and a storage system 2 that stores a database 101.

The DBMS 100 of the server 1 receives data access requests from an access terminal (terminal computer) 5 and the like via a network 3, and executes data access with respect to the database 101 in response to the request.

The server 1 is equipped with a CPU 11 for executing arithmetic operations, a memory 12 for storing programs and data temporarily, a data transfer controller 13 for controlling I/O access in cooperation with the CPU 11, a communication unit (network interface) 14 connected to the network 3, and a storage-system-connected interface 15.

The memory 12 stores a program of the DBMS 100, and the CPU 11 executes the program of the DBMS 100. The data transfer controller 13 transfers data among the CPU 11, the communication unit 14, and the storage-system-connected interface 15. The storage-system-connected interface 15 is connected to the storage system 2 via a storage area network (SAN) 4. The DBMS 100 is composed of an SQL execution module 110, a buffer management module 120, a evacuating instruction adding module 130, a data area management table 121, and a DB buffer 140.

Figure 2:
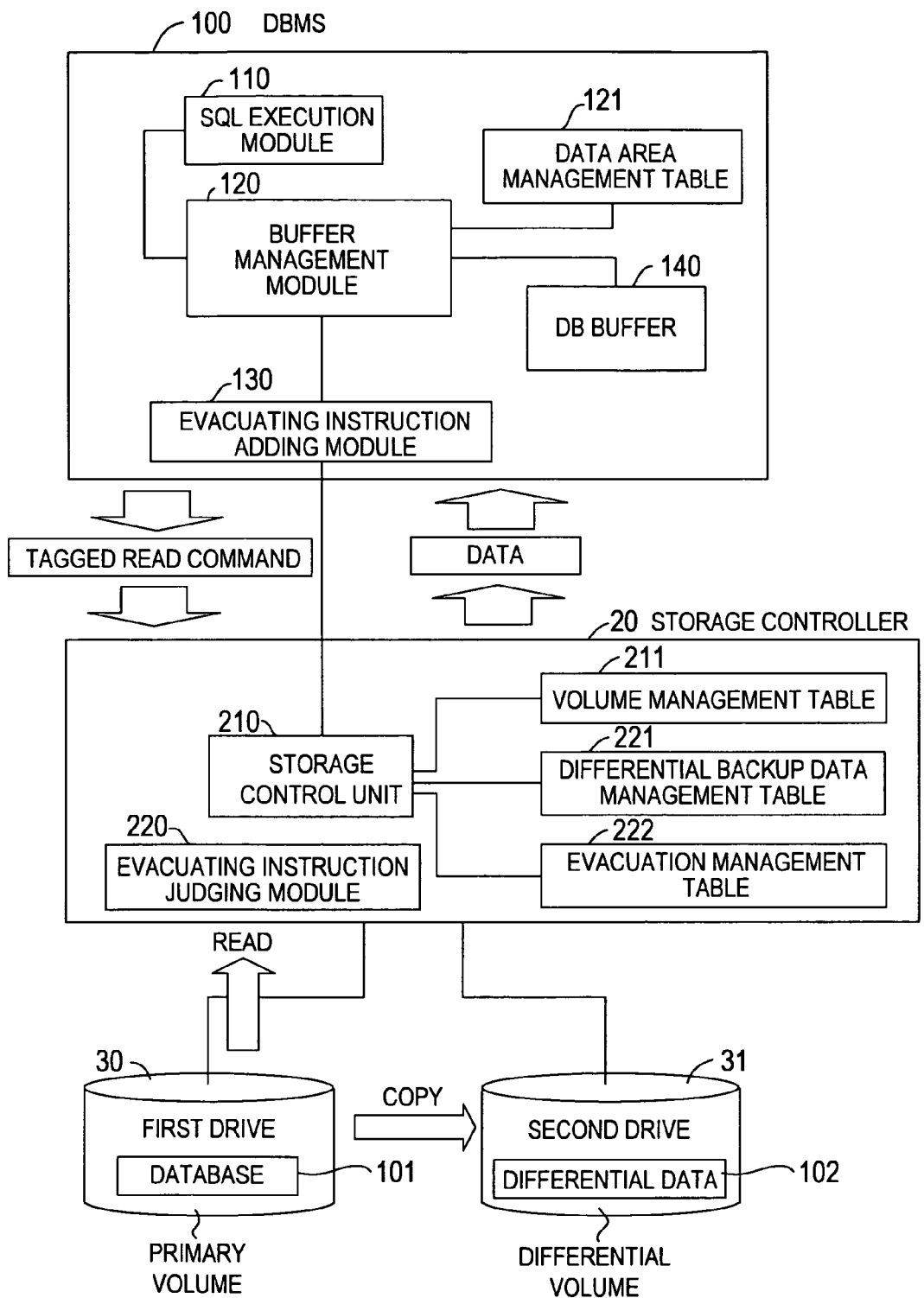
FIG. 2 is a function block diagram of a DBMS of a server and of a storage controller of a storage system.

The storage system 2 is composed of two drives 30 and 31 and a storage controller 20 for controlling those drives. Herein, the drives 30 and 31 are devices for storing data. Hereinafter, the drive 30 shown in FIGS. 1 and 2 is referred to as a first drive 30, while the drive 31 shown therein is referred to as a second drive 31.

The storage controller 20 is equipped with a CPU 21 for executing arithmetic operations, a memory 22 for storing programs and data, a data transfer controller 23, an interface 24 connected to the SAN 4, an interface 25 connected to the first drive 30 and the second drive 31, and an interface 26 connected to the network 3.

The memory 22 stores a storage control unit 210 and an evacuating instruction judging module 220 in the form of programs, and the CPU 21 executes those programs to access the first drive 30 and the second drive 31. The data transfer controller 23 transfers data among the CPU 21 and the interfaces 24 and 25.

The storage control unit 210 receives a command related to data access from the server 1, and accesses data stored in the first drive 30 and the second drive 31. Herein, the data access command is issued for a data reference (read) or a data update (write). As described later, the storage system 2 according to this invention can receive a data reference command including a data evacuating instruction, or a data evacuating command.

In order to judge whether or not a command received from the server 1 includes a data evacuating instruction, the storage control unit 210 sends the received command to the evacuating instruction judging module 220. The evacuating instruction judging module 220 judges whether or not the command includes a data evacuating instruction, and a result thereof is sent to the storage control unit 210. As described later with reference to FIGS. 10 and 12, the storage control unit 210 executes a data evacuation when the command includes the data evacuating instruction.

As shown in FIG. 2, the storage control unit 210 manages a volume management table 211. As exemplified in FIG. 5, the volume management table 211 indicates correspondences between volumes functioning as logical data storage areas and drives. The volume is sometimes called a logical unit. In the example of FIG. 5, an entry whose volume name 2111 is "VOL1" has a value "first drive" specified as a drive name 2113, which implies that a volume "VOL1" corresponds to the first drive 30. Likewise, it is implied that a volume "VOL2" corresponds to the second drive 31. A single volume may be made to correspond to a plurality of drives, but FIG. 5 shows the example of a correspondence between volumes and drives on a one-to-one basis.

In addition, the volume management table 211 indicates a type 2112 and a differential volume name 2114. Values specified as the type 2112 include "Primary" and "Differential". A value "Primary" indicates an evacuation source volume from which a differential snapshot is to be evacuated, while a value "Differential" indicates an evacuation destination volume to which the differential snapshot is to be evacuated. In the example of FIG. 5, the volume "VOL1" is specified with the value "Primary" and the volume "VOL2" is specified with the value "Differential", which implies that the volume "VOL1" is specified as the evacuation source volume and the volume "VOL2" is specified as the evacuation destination volume. Further, a value "VOL2" is specified as the differential volume name 2114 of the volume "VOL1", which implies that the volume "VOL2" is the evacuation destination volume to which the differential snapshot of the volume "VOL1" is to be evacuated. In addition, a value "VOL1" is specified as the differential volume name 2114 of the volume "VOL2", which implies that the volume "VOL1" is the evacuation source volume from which the differential snapshot of the volume "VOL2" is to be evacuated.

The data storage area of a volume is managed by being segmented into areas each having a predetermined size of, for example, 512 bytes, and by assigning an address to each of the segmented areas. The address is sometimes called a logical block address (LBA). FIG. 6 shows an example of the database 101 stored in the volume "VOL1". An address 1011 is a number assigned to each area within the volume "VOL1" having a predetermined size, and in the example of FIG. 6, a data item "AAA" is stored at an address "0" within the volume "VOL1". As described above, the drive managed by the storage system can be accessed by using the volume name and the address. For example, when a data access command for instructing read of data located at the address "0" is received from the server 1 the storage control unit 210 sends the data item "AAA" to the server 1.

Further, as shown in FIG. 2, the storage control unit 210 further manages a differential backup data management table 221 and an evacuation management table 222. The differential backup data management table 221 exemplified in FIG. 7 indicates an address 2211 within the evacuation source volume of the differential snapshot and an address 2212 within the evacuation destination volume. A first entry shown in FIG. 7 indicates that data located at an address "100" within the evacuation source volume "VOL1" is evacuated to an address "0" within the evacuation destination volume "VOL2". Likewise, a second entry indicates that data located at an address "200" within the evacuation source volume "VOL1" is evacuated to an address "1" within the evacuation destination volume "VOL2", and a third entry indicates that data located at an address "300" within the evacuation source volume "VOL1" is evacuated to an address "2" within the evacuation destination volume "VOL2".

In the evacuation management table 222, it is recorded whether or not data stored in the evacuation source volume has already been evacuated. An evacuation flag 2222 indicates a value "0" or a value "1". The value "0" implies that the data has not been evacuated yet, while the value "1" implies that the data has already been evacuated. In the example of FIG. 8, the evacuation flag 2222 corresponding to the address "0" within the evacuation source volume "VOL1" is set to "0", which implies that the data has not been evacuated yet. FIG. 8 similarly indicates that the addresses "1" and "2" within the volume "VOL1" have not been evacuated yet. When the data within the evacuation source volume is evacuated to the evacuation destination volume, the storage control unit 210 modifies records in the differential backup data management table 221 and the evacuation management table 222.

Next, description will be made of an operational example of the DBMS 100.

As shown in FIG. 1, the program of the DBMS 100 is stored in the memory 12 of the server 1, and executed by the CPU 11. The DBMS 100 receives a data access request from the access terminal 5, and creates a query plan corresponding to the request. Herein, the data access request represents an instruction to update or refer to data described in Structured Query Language (SQL) or other such language. The query plan represents a method of executing specified data access. Designated in the query plan are a volume name and an address of data to be read, a modification method for the read data, and the like.

The SQL execution module 110 creates a query plan based on a data access request received from the access terminal 5. The data access request is made to, for example, refer to data corresponding to an entry having a value "Warehouse" as a table name, a value "W_id" as an identification column name, and a value "1" as an identification column. To create a query plan from the data access request, the SQL execution module 110 uses a data area management table 121. As shown in FIG. 3, the data area management table 121 includes a table name 1210, an identification column name 1211, an identification column 1212, a volume name 1213, and an address 1214. In the example of FIG. 3, it is understood that the data corresponding to an entry having the value "Warehouse" as the table name 1210, the value "W_id" as the identification column name 1211, and the value "1" as the identification column 1212 is stored at the address "0" within the volume "VOL1". It is thus possible to create a query plan for obtaining the data located at the address "0" within the volume "VOL1" of the storage system 2, and sending the data to the access terminal 5. It should be noted that the reference to a single data item is illustrated above as an example of the data access request, but it is possible to repeat the above-mentioned access to thereby create a query plan corresponding to a data access request including a plurality of data references and data updates.

The SQL execution module 110 performs a data reference or a data update according to the created query plan. In a case of the data reference, the SQL execution module 110 notifies the buffer management module 120 of the volume name and address of data to be referred to. The buffer management module 120 manages the DB buffer 140, and when the requested data is stored in the DB buffer 140, the data is passed to the SQL execution module 110. The SQL execution module 110 sends the data received from the buffer management module 120 to the access terminal 5. FIG. 4 shows an example of data stored in the DB buffer 140. The DB buffer 140 includes a volume name 1401, an address 1402, and data 1403, which are used to judge whether or not the data requested by the SQL execution module 110 has already been read into the DB buffer 140. In a case where the data requested by the SQL execution module 110 has not been read into the DB buffer 140, the buffer management module 120 issues a data reference command to the storage system 2, and stores the read data into the DB buffer 140. Then, the buffer management module 120 passes the data to the SQL execution module 110.

Upon the data update, the SQL execution module 110 notifies the buffer management module 120 of the volume name and address of data to be updated. When the requested data is stored in the DB buffer 140, the buffer management module 120 passes the data to the SQL execution module 110. When the requested data is not stored in the DB buffer 140, the buffer management module 120 issues a data read command to the storage system 2, stores the read data into the DB buffer 140, and passes the data to the SQL execution module 110. The SQL execution module 110 performs an update on the received data, and passes the data to the buffer management module 120. The buffer management module 120 stores the received data into the DB buffer 140, and issues a data update command to the storage system 2.

According to the operational example of the DBMS 100 described above, the SQL execution module 110 can judge which of an update and a reference is intended for the data. For example, upon reception of a data update request from the access terminal 5, requested data is to be updated. Alternatively, in a case where a query plan including a plurality of data references and data updates is created, if data is referred to before being updated, it can be judged that the update is intended for the data at a time of the data reference. In a case where the data is judged to be updated, the SQL execution module 110 notifies the buffer management module 120 of the volume name and address and that the data is to be updated. The buffer management module 120, which has been notified that the data is to be updated, sends a data reference command to the evacuating instruction adding module 130. The evacuating instruction adding 130 adds a tag for instructing an evacuation of the data to the data reference command, and sends the data reference command to the buffer management module 120. The buffer management module 120 sends the data reference command added with the instruction to evacuate the data to the storage system 2. The storage system 2 that has received the data read-command with a data evacuation tag evacuates the data stored in the evacuation source volume to the evacuation destination volume, and sends the data to the server 1.

In a case where the data to be updated already exists in the DB buffer 140, the buffer management module 120 can issue to the storage system 2 a command to instruct only an evacuation. Thus, the storage system 2 can previously execute the operation of evacuating the data stored in the evacuation source volume to the evacuation destination volume.

Figure 15:
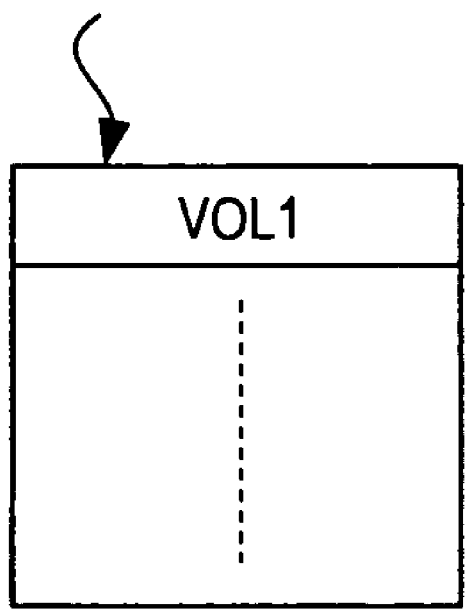
FIG. 15 is an explanatory diagram showing an example of a differential evacuation attribute table, which is managed by a storage controller of a storage system according to a third embodiment.

In addition to the above-mentioned embodiment, there is another embodiment in which the storage system 2 manages an evacuation volume setting table 223 shown in FIG. 15. In this embodiment, when data stored in a volume set in the evacuation volume setting table 223 is accessed, the storage system 2 evacuates the data to the evacuation destination volume.

<Details of the Processing>

Figure 9:
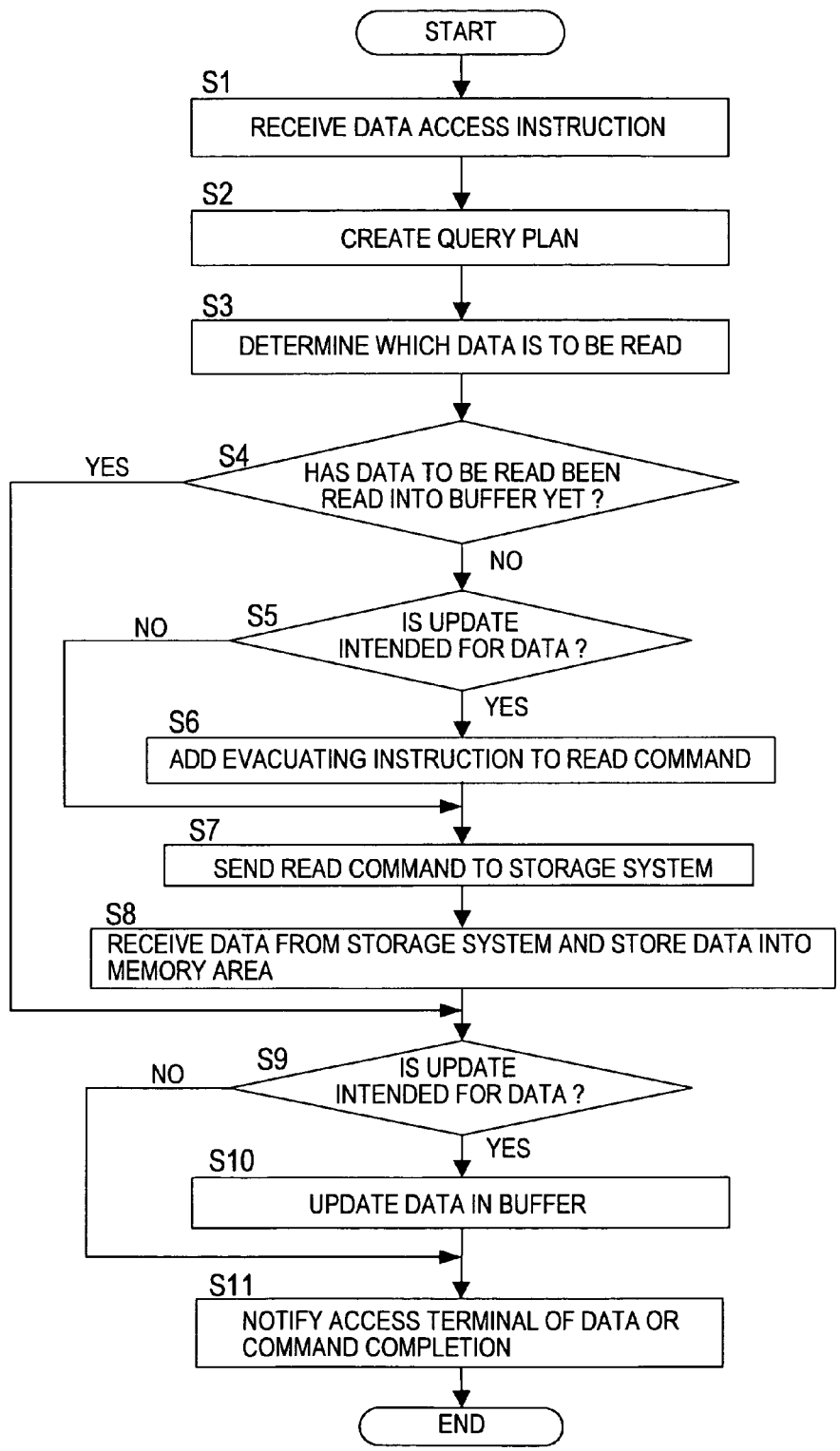
FIG. 9 is a flow chart showing an example of a processing that is executed by the DBMS of the server.

Described next are details of processings executed by the DBMS 100 of the server 1 and by the storage controller 20 of the storage system 2. FIG. 9 is a flow chart showing an example of the processing executed by the DBMS 100 each time a query is received from the access terminal 5.

When receiving a query (data access instruction) from the access terminal 5 (S1), the DBMS 100 analyzes contents of the query and creates a query plan (S2). In Step S3, the DBMS 100 determines which data is to be read from the storage system 2 into the server 1 based-on the created query plan.

In Step S4, the DBMS 100 judges whether or not the data to be read into the server 1 has been read into the DB buffer 140. In a case where the data to be read is already stored in the DB buffer 140, the processing advances to Step S9. In a case where the data is not stored in the DB buffer 140, the processing advances to Step S5.

In Step S5, the DBMS 100 judges whether or not an update is intended for the data to be read from the storage system 2. In other words, the DBMS 100 analyzes the query plan that has been created in Step S2, and judges whether or not the data is to be updated after having been read into the server 1. In a case where the data is to be updated, the processing advances to Step S6, in which a reference command with a data evacuation tag is created. In a case where the data is not to be updated, a normal reference command is set, and the processing advances to Step S7.

In Step S7, the reference command with the data evacuation tag or the reference command that has been set in Steps S5 and S6 is sent to the storage system 2.

In Step S8, the DBMS 100 receives data that has been sent from the storage system 2 in response to the reference command with the data evacuation tag or the reference command. The DBMS 100 stores the received data into the DB buffer 140.

In Step S9, the DBMS 100 judges whether or not to update the data that has just (or already) been read into the DB buffer 140. In a case where the read data is to be updated, the processing advances to Step S10, in which an update based on the query plan is executed on the data in the DB buffer 140. In a case where the read data is not to be updated, the processing advances to Step S11, in which the DBMS 100 notifies the access terminal 5 that has sent the query of the result of the query.

When data read into the DB buffer 140 of the server 1 is to be updated, by executing the above processing each time a query is received from the access terminal 5, it is possible to issue a reference command with a data evacuation tag and execute an evacuation of the data as well as the data reference.

Specific examples of the data access instruction sent from the access terminal 5 to the server 1 in Step S1 include "UPDATE Warehouse SET name="Tokyo" WHERE W_id=1". This example represents an instruction to modify the value of the identification column 1212 of an entry having the value "Warehouse" as the table name 1210 and the value "W_id" as the identification column name 1211 from "1" to "Tokyo" as shown in FIG. 3.

The above description shows an example of using an UPDATE sentence, but such a data access instruction as "SELECT name FROM Warehouse WHERE $W\_{id=}1$" can also be accepted. This sentence represents an instruction to read data corresponding to an entry having the value "1" as the identification column 1212 in the column "W_id" of the table "Warehouse".

Figure 10:
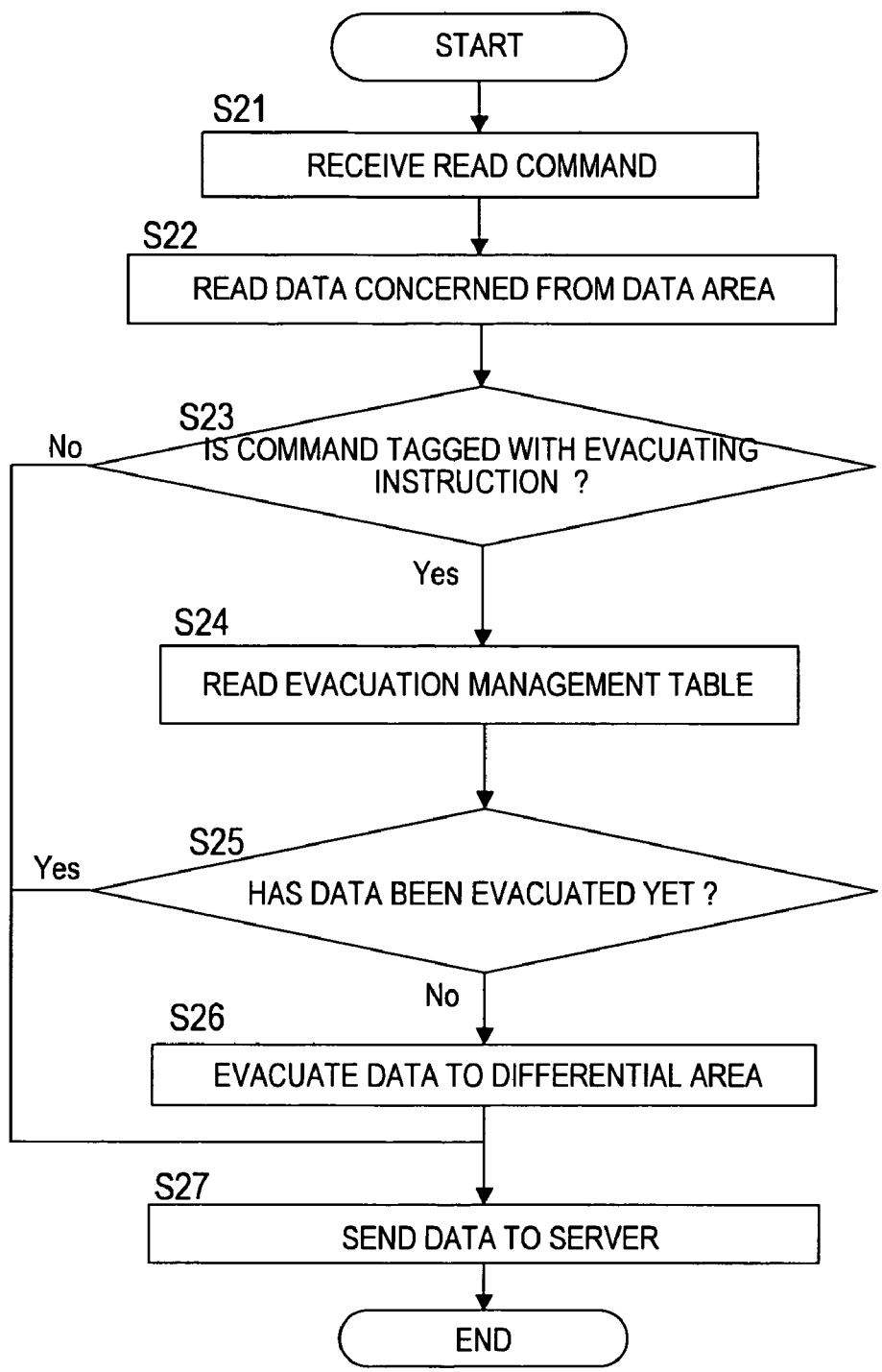
FIG. 10 is a flow chart showing an example of a processing that is executed by the storage controller of the storage system when a reference command or a tagged reference command is received.
Figure 11:
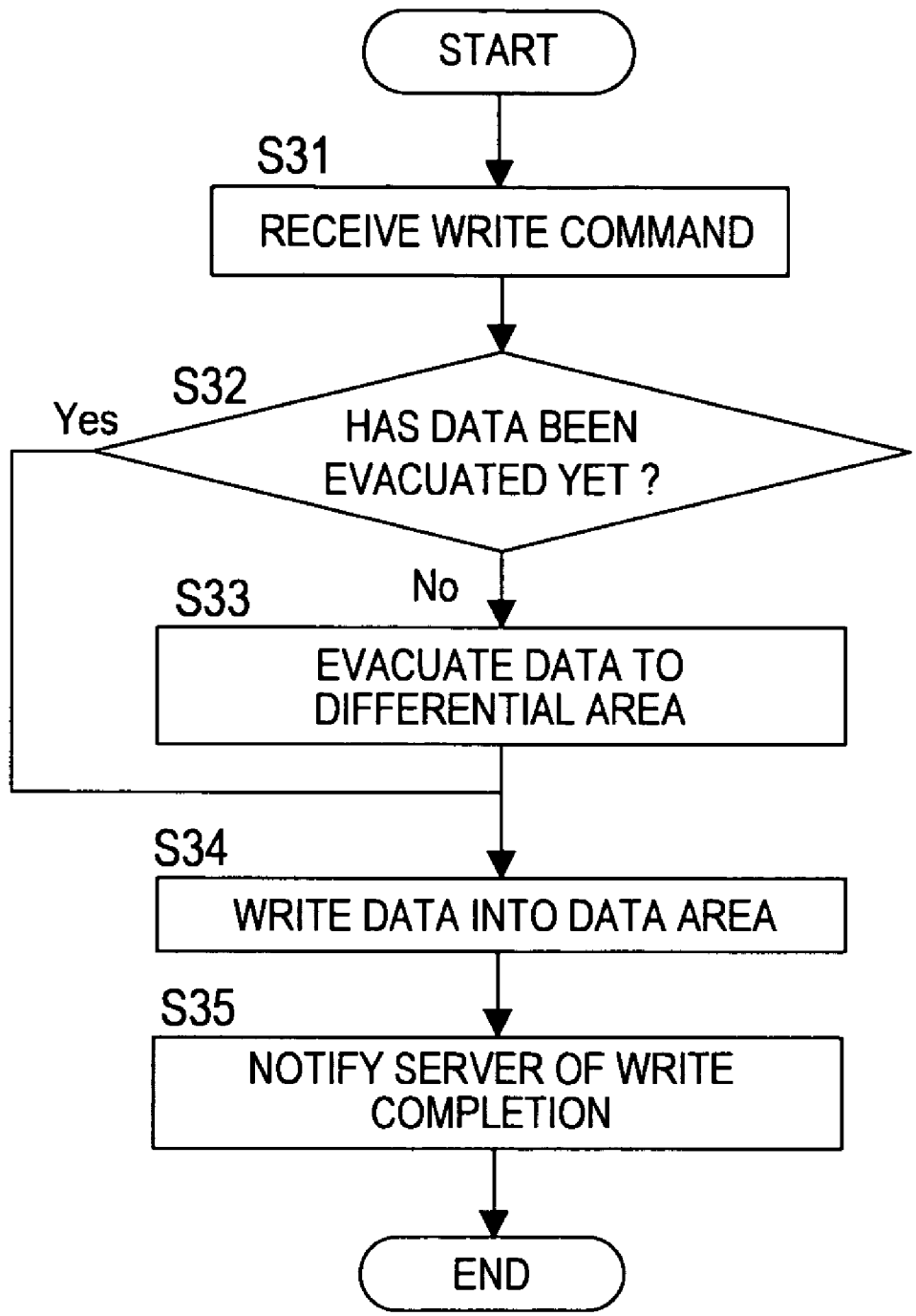
FIG. 11 is a flow chart showing an example of a processing that is executed by the storage controller of the storage system when a write command is received.
Figure 12:
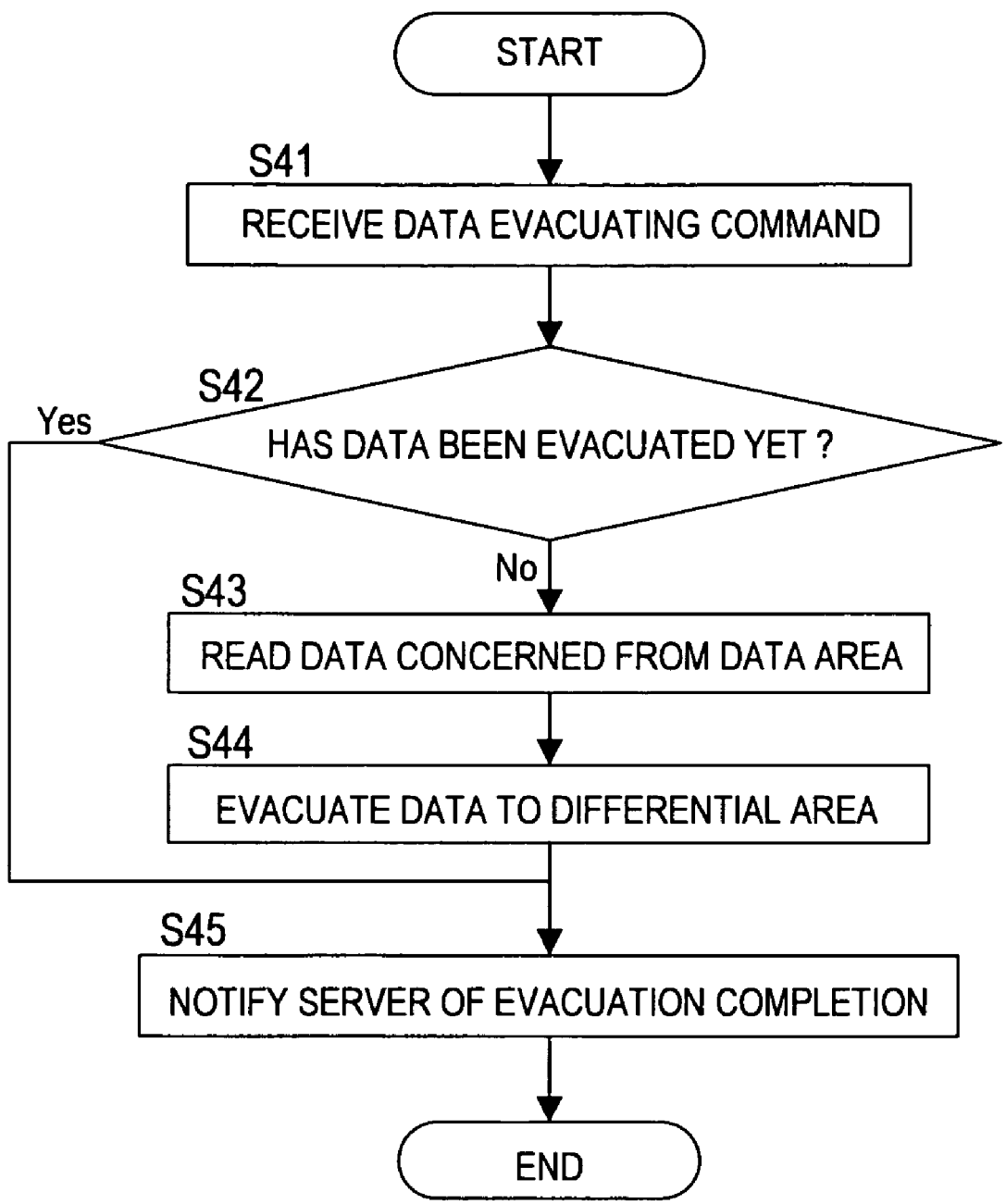
FIG. 12 is a flow chart showing an example of a processing that is executed by the storage controller of the storage system when a data evacuating command is received.

Described next is the processing executed by the storage controller 20 of the storage system 2. FIGS. 10 to 12 are flow charts showing examples of processings executed by the storage controller 20. FIG. 10 shows a processing performed when the storage controller 20 receives a reference command or a reference command with a data evacuation tag through the SAN 4. FIG. 11 shows a processing performed when the storage controller 20 receives a write command through the SAN 4. FIG. 12 shows a processing performed when the storage controller 20 receives a data evacuating command through the SAN 4.

First, in the processing of FIG. 10 in which the received command is a reference command or a reference command with a data evacuation tag, in Step S21, the storage controller 20 receives a reference command (or reference command with a data evacuation tag). In Step S22, the storage controller 20 reads data located at an address designated in the reference command from a primary volume.

Figure 13:
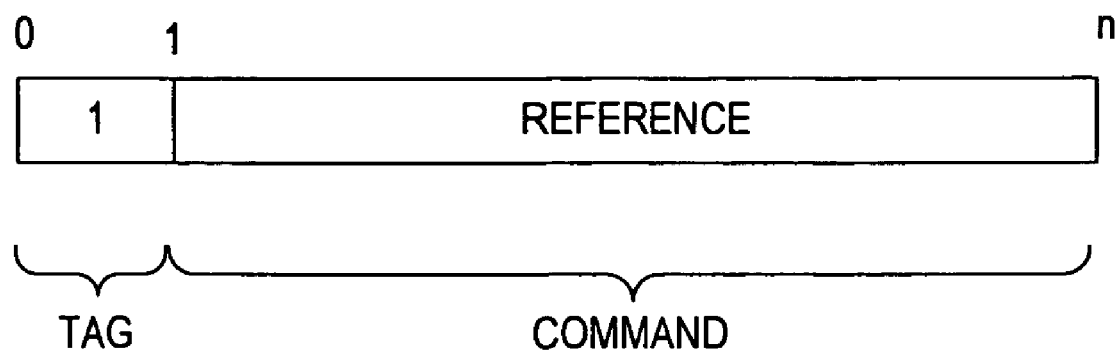
FIG. 13 is an explanatory diagram of a command and a tag.

In Step S23, it is judged whether or not the received reference command is a tagged reference command by checking the received reference command for a tag. For example, referring to FIG. 13, in a case where a command received by the storage controller 20 is expressed by n bits, a 1st bit is set as a tag area, and 2nd to nth bits are set as a command area. For example, a value "1" set in the tag area indicates a tag instructing a data evacuation, while a value "0" set in the tag area indicates that there is no tag instructing a data evacuation.

In Step S23, it is judged whether or not the data evacuation is instructed based on the value set in the tag area added to the reference command. When judged that the data evacuation is instructed, the processing advances to Step S24 to execute the data evacuation. When judged that the data evacuation is not instructed, the processing advances to Step S27, in which the data is sent to the server 1 that has made the request.

In the case of a reference command with a data evacuation tag, in Step S24, the storage controller 20 refers to the evacuation management table 222 for the address within the primary volume at which the data has been read in Step S22, to thereby judge whether or not the evacuation has been completed based on the value of the evacuation flag 2222. When it is judged that the evacuation of the data within the primary volume has not been completed, the processing advances to Step S26, in which a differential snapshot is created. When it is judged that the evacuation of the data has been completed, the processing advances to Step S27.

In Step S26, the data read from the primary volume is copied to a differential volume to carry out a data evacuation. After the evacuation of the data is completed, the storage controller 20 writes, into the differential backup data management table 221, the address 2211 within the primary volume from which the data is copied and the evacuation destination address 2212 within the evacuation destination differential volume. Now that the data evacuation is completed, the storage controller 20 sets "1" as the evacuation flag 2222 of the evacuation management table 222 for the corresponding address 2221 within the primary volume, and thus records the completion of the data evacuation.

In Step S27, the storage controller 20 sends the data that has completed the data evacuation to the server 1 that has made the request, thereby ending the processing. In a case of the reference command without the data evacuating instruction, the data within the primary volume that has been read in Step S22 is sent as it is to the server 1.

As described above, in a case of the reference command with the data evacuation tag, data read by the storage controller 20 is copied from the primary volume to the differential volume, and then the data requested by the server 1 is sent. After the data has completed the evacuation, the differential backup data management table 221 and the evacuation management table 222 are updated.

Next, FIG. 11 is used to describe the processing performed when the storage controller 20 receives a write command.

First, in Step S31, the storage controller 20 receives a write command. Next, in Step S32, the storage controller 20 judges whether or not data has been evacuated from an address at which the data is requested to be written. When it is judged as a result that the evacuation has not been completed, the processing advances to Step S33, in which data within the primary volume requested to be written is evacuated to a differential volume. After the data evacuation is completed, the storage controller 20 writes, into the differential backup data management table 221, the address 2211 within the primary volume from which the data is copied and the evacuation destination address 2212 within the evacuation destination differential volume.

When judged in Step S32 that the data within the primary volume requested to be written has already been evacuated, the processing advances to Step S34.

In Step S34, the storage controller 20 updates the data within the primary volume requested to be written. In Step S35, the storage controller 20 sends to the server 1 a notification of the completion of the data write, thereby ending the processing.

Next, FIG. 12 is used to describe the processing performed when the storage controller 20 receives a data evacuating command.

First, in Step S41, the storage controller 20 receives a data evacuating command. Next, in Step S42, the storage controller 20 judges whether or not the evacuation has been completed on data located at an address within the primary volume from which data is to be evacuated, in a manner similar to Steps S24 and S25. When judged as a result that the evacuation has not been completed, the processing advances to Step S43, in which the data within the primary volume requested to be written is read. In Step S44, the read data is copied to the differential volume, thereby completing the evacuation. After the data within the primary volume completes the evacuation, the storage controller 20 writes, into the differential backup data management table 221, the address 2211 within the primary volume from which the data is copied and the evacuation destination address 2212 within the evacuation destination differential volume. The storage controller 20 also resets "1" as the evacuation flag 2222 of the evacuation management table 222 for the corresponding address 2221, and thus records the completion of the data evacuation.

In a case where the data within the primary volume requested to be written has already completed the evacuation, the processing advances to Step S45.

In Step S45, the storage controller 20 sends to the server 1 a notification of the completion of the data evacuation, thereby ending the processing.

As described above, in a case of the data evacuating command, the storage controller 20 evacuates the data to be evacuated, from the primary volume to the differential volume, and updates the differential backup data management table 221 and the evacuation management table 222.

The data evacuating command may be issued by the DBMS 100 to the storage system 2 in a case where data to be referred to by the DBMS 100 has been read into the DB buffer 140 and updated in the DB buffer 140. In this case, when a reference request is made to data that has not been written into the storage system 2 after having been updated in the DB buffer 140, the storage controller 20 of the storage system 2 can previously create a differential snapshot before the data evacuating command is received and data write takes place. With a differential snapshot having been already created, only the data write needs to be executed to update, in the storage system 2, data that has been updated in the DB buffer 140, which speeds up the processing of the storage system 2.

As has been described above, this invention includes: judging whether or not an update is intended for data to be referred to when the server 1 refers to data within the storage system 2; and when the update is intended for the data, issuing a reference command tagged with a data evacuating instruction. The storage controller 20 of the storage system 2, which has received the reference command with the data evacuation tag, sends the data requested to be referred to, to the server 1 after the evacuation of the data is completed. In this way, the data evacuation and the data read are accomplished by sending the tagged reference command only once from the server 1 to the storage system 2.

The first embodiment shows an example in which the DBMS 100 runs on the server 1. However, this invention is applicable to any applications and services that allow judgment or estimation as to whether or not a later update is intended for data to be referred to when the data reference is requested to the storage system 2.

While the SAN 4 is used to connect the server 1 and the storage system 2 in the first embodiment, this invention is also applicable to a case where the storage system 2 is connected to the server 1 via an interface such as a SCSI or a SATA.

Second Embodiment

Figure 14:
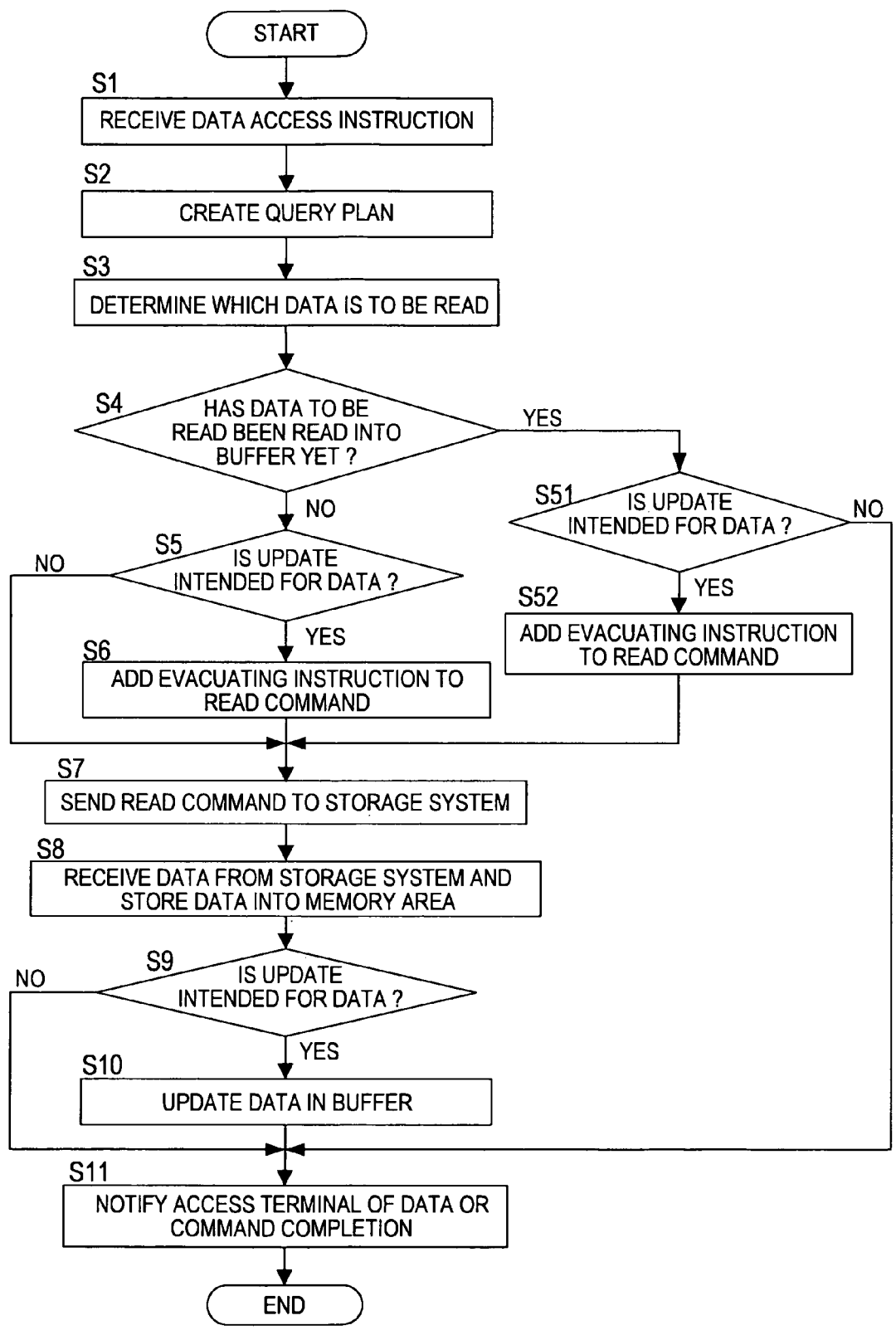
FIG. 14 is a flow chart showing an example of a processing that is executed by a DBMS of a server according to a second embodiment.

FIG. 14 shows a second embodiment in which the processing of the DBMS 100 running on the server 1 as described in the first embodiment with reference to FIG. 9 is partially modified so that data is evacuated in advance by executing a tagged reference command irrespective of whether data to be referred to is stored in the DB buffer 140 or not as long as an update is intended for the data. The rest of the configuration of the second embodiment is the same as that of the first embodiment.

In FIG. 14, Steps S1 to S3 and S5 to S11 of the processing executed by the DBMS 100 are the same as those of FIG. 9 which have been described in the first embodiment. FIG. 14 departs from FIG. 9 described in the first embodiment after YES is given as the judgment of Step S4.

In the case where the data to be referred to is not stored in the DB buffer 140 in Step S4, the processing advances to Step S5 as described in the first embodiment with reference to FIG. 9. In the case where the data to be referred to is already stored in the DB buffer 140, the processing advances to Step S51 to judge whether or not the data is to be updated. It is judged whether or not the corresponding data is to be updated after being read into the server 1 by analyzing the query plan that has been created in Step S2. In the case where the data is to be updated, the processing advances to Step S52, in which a tagged reference command is set in order to execute a creation of a differential snapshot. In Step S52, a tagged reference command is set for the data in the DB buffer 140, and the processing advances to Step S7, in which the storage system 2 is instructed to refer to the data and create a differential snapshot.

When it is judged in Step S51 that the data is not to be updated, the processing advances to Step S11 in order to notify the server 1 that the data has already been read.

As has been described above, the tagged reference command is issued for data that is already stored in the DB buffer 140 and data that is not in the DB buffer 140 alike as long as the data read by the DBMS 100 is to be or is expected to be updated after the data is read into the server 1, so that a differential snapshot of the data is created in advance. Accordingly, when the DBMS 100 updates data that is expected to be updated in the storage system 2 and requests the storage system 2 to write the data, the data is immediately written since a differential snapshot of the data has been created in advance. This saves the storage system 2 time for creating a differential snapshot of data requested to be written, and thus allows an increase in speed of the write processing.

Third Embodiment

In addition to the above-mentioned embodiments, there is another embodiment in which the storage controller 20 for managing an evacuation volume setting table 223 shown in FIG. 15. The storage controller 20 stores the evacuation volume setting table 223 in the memory 22. Stored in the evacuation volume setting table 223 is a volume name of a volume from which the data that has been referred to is evacuated to the differential volume. The evacuation volume setting table 223 is set through the management terminal 6 or the like.

Upon reception of the reference command from the server 1, the storage control unit 210 judges whether or not a volume designated in the command is set in the evacuation volume setting table 223. When the volume designated in the command is set in the evacuation volume setting table 223, the storage control unit 210 evacuates the data within the primary volume to the differential volume, and then sends the data to the server 1.

Also in this embodiment, upon the data reference, the data within the primary volume is evacuated to the differential volume, which makes it possible to reduce the loads on the primary volume.

In this specification, description has been made by using the DBMS as the application program for accessing data, but the application program is not limited to the DBMS.

Consequently, according to this invention, it is possible to reduce the loads on the storage system by evacuating data when a reference is intended for data.

While the present invention has been described in detail and pictorially in the accompanying drawings, the present invention is not limited to such detail but covers various obvious modifications and equivalent arrangements, which fall within the purview of the appended claims.

What is claimed is:

1. A method of managing data in a system including a storage system and a server computer, wherein the storage system comprises a storage controller and a nonvolatile storage, the nonvolatile storage including a first volume and a second volume, and wherein the server computer conducts an updating operation of the first volume by updating data cached in a buffer memory provided in the server computer, the method comprising the steps of:

receiving, by the server computer, a data access request from an access terminal;

determining, by the server computer, which data is to be accessed according to the data access request;

determining, by the server computer, which of an update and a reference is to be currently transacted by the server computer according to the data access request;

determining, by the server computer, whether or not the data to be accessed has been cached in the buffer memory;

when it is determined that a reference is to be currently transacted and the data to be accessed has not been cached in the buffer memory yet, reading the data to be accessed from said first volume and caching the data to be accessed in the buffer memory;

when it is determined that an update is to be currently transacted and the data to be accessed has not been cached in the buffer memory yet, issuing, by the server computer, a first command instructing the storage system to read the data to be accessed and to evacuate the data to be accessed from the first volume into the second volume, receiving from the storage system the data to be accessed, caching the data to be accessed in the buffer memory, and executing the update in the buffer memory;

when it is determined that an update is to be currently transacted and the data to be accessed has been cached in the buffer memory, issuing, by the server computer, a second command instructing the storage system to evacuate the data to be accessed from the first volume into the second volume and executing the update in the buffer memory; and when the storage system receives one of the first command and the second command from the server computer, determining, by the storage system, whether the data to be accessed, according to the received one of the first command and the second command, has been evacuated or not, and evacuating the data to be accessed according to the received one of the first command and the second command into the second volume only if the data to be accessed has not been evacuated.

* * * * *